(12) United States Patent
Seo et al.

(10) Patent No.: US 10,164,279 B2
(45) Date of Patent: Dec. 25, 2018

(54) DEVICE FOR DECREASING HYDROGEN CONCENTRATION OF FUEL CELL SYSTEM

(71) Applicant: HYUNDAI MOTOR COMPANY, Seoul (KR)

(72) Inventors: Sang Hoon Seo, Suwon-si (KR); Myung Ju Jung, Daejeon (KR)

(73) Assignee: Hyundai Motor Company, Seou (KR)

( * ) Notice: Subject to any disclaimer, the term of this patent is extended or adjusted under 35 U.S.C. 154(b) by 183 days.

(21) Appl. No.: 15/293,697

(22) Filed: Oct. 14, 2016

(65) Prior Publication Data

US 2017/0263963 A1    Sep. 14, 2017

(30) Foreign Application Priority Data

Mar. 8, 2016  (KR) .................. 10-2016-0027663

(51) Int. Cl.

| | |
|---|---|
| *H01M 8/10* | (2016.01) |
| *H01M 8/0662* | (2016.01) |
| *H01M 8/04223* | (2016.01) |
| *H01M 8/04701* | (2016.01) |
| *B01D 53/00* | (2006.01) |
| *B01D 53/88* | (2006.01) |
| *H01M 8/04119* | (2016.01) |

(52) U.S. Cl.
CPC .......... *H01M 8/0662* (2013.01); *B01D 53/00* (2013.01); *B01D 53/88* (2013.01); *H01M 8/04231* (2013.01); *H01M 8/04716* (2013.01); *B01D 2255/106* (2013.01); *B01D 2255/1023* (2013.01); *B01D 2257/108* (2013.01); *B01D 2258/0208* (2013.01); *H01M 8/04141* (2013.01); *H01M 2250/20* (2013.01); *Y02T 90/32* (2013.01)

(58) Field of Classification Search
CPC ....................................................... H01M 8/10
See application file for complete search history.

(56) References Cited

U.S. PATENT DOCUMENTS

| | | | |
|---|---|---|---|
| 2009/0233133 A1* | 9/2009 | Lee | ................... H01M 8/04141 429/413 |
| 2013/0011301 A1* | 1/2013 | Edlund | ................... C01B 3/384 422/162 |

FOREIGN PATENT DOCUMENTS

| | | |
|---|---|---|
| JP | 2005-005099 A | 1/2005 |
| JP | 2005-174757 A | 6/2005 |
| JP | 2006-147470 A | 6/2006 |
| JP | 2008-108667 A | 5/2008 |
| JP | 2009-117044 A | 5/2009 |
| JP | 2009-170209 A | 7/2009 |
| KR | 10-0645247 B1 | 11/2006 |

* cited by examiner

*Primary Examiner* — Jacob B Marks
(74) *Attorney, Agent, or Firm* — McDermott Will & Emery LLP

(57) ABSTRACT

A device for decreasing hydrogen concentration of a fuel cell system is installed in an exhaust system for discharging exhaust gas which includes hydrogen and air and is discharged from fuel cells to the atmosphere through an exhaust line. The device includes a catalyst diluter having catalysts for diluting the hydrogen in an exhaust gas by generating a catalytic reaction and connected to the exhaust line. An air diluter is disposed outside the catalyst diluter and guides external air to a gas exit side of the catalyst diluter.

16 Claims, 7 Drawing Sheets

DEVICE FOR DECREASING HYDROGEN CONCENTRATION OF FUEL CELL SYSTEM

CROSS-REFERENCE TO RELATED APPLICATION

This application claims the benefit of priority to Korean Patent Application No. 10-2016-0027663 filed in the Korean Intellectual Property Office on Mar. 8, 2016, the entire content of which is incorporated herein by reference.

TECHNICAL FIELD

The present disclosure relates to an exhaust system of a fuel cell system, and more particularly, to a device for decreasing concentration of hydrogen discharged to the atmosphere together with air from a fuel cell system.

BACKGROUND

In general, a fuel cell system generates electrical energy by supplying air and hydrogen to a fuel cell and using an electrochemical reaction of the hydrogen and oxygen generated by the fuel cell. For example, a fuel cell system is used to operate driving sources such as an electric motor in vehicles, ships, trains, and airplanes.

The fuel cell system includes a fuel cell stack, a hydrogen supplier that supplies hydrogen to the anodes of the fuel cells, an air supplier that supplies air to the cathodes of the fuel cells, and a heat/water control unit that removes heat and water, which are reaction by-products from the fuel cells, and controls the operational temperature of the stack.

In a polymer electrolyte membrane fuel cell, an appropriate amount of water is required for smooth operation of an ion exchange membrane of a membrane-electrode assembly (MEA), so fuel cell systems have a humidifier that humidifies a reaction gas that is supplied to stacks.

Such a humidifier humidifies air supplied from an air supplier, using water in high-temperature and high-humidity air discharged from the cathodes of fuel cells, and supplies the humidified air to the cathodes of the fuel cells.

Further, the fuel cell system includes a hydrogen recycler that mixes the hydrogen discharged from the anodes of fuel cells with the hydrogen supplied from a hydrogen supplier, and supplies the mixture back to the anodes.

While a fuel cell system is operated, impurities such as nitrogen and vapor are accumulated on the anodes of fuel cells, so the concentration of hydrogen decreases, and when the concentration of the hydrogen excessively decreases, cell separation may occur in the fuel cell stack.

In order to solve these problems, when the fuel cell system starts and operates, a purge valve periodically opens and impurities are discharged with hydrogen from the anodes, thereby maintaining the concentration of hydrogen at the anodes at a predetermined level or more.

When the anodes are purged by opening the purge valve, the anodes discharge hydrogen with impurities and a purge gas flows into a humidifier together with the air discharged from the cathodes.

Then, the vapor in the impurities is used as a source for humidifying a reaction gas needed for an electrochemical reaction of the fuel cells and the gas including hydrogen and nitrogen is discharged with air to the atmosphere through an exhaust system.

According to the above hydrogen purge type, the hydrogen discharged from anodes is mixed with the air discharged from the cathodes and then discharged to the atmosphere through an exhaust system, thereby achieving an effect of reducing the concentration of purge hydrogen by diluting the hydrogen with air.

Further, when a fuel cell system starts or stops or when a fuel cell vehicle equipped with a fuel cell system is in an idling condition (for example, a fuel cell vehicle is in an ISG condition), a large amount of hydrogen crossing over from the anodes to the cathodes of the fuel cells through a membrane is discharged.

The hydrogen is discharged with air to a humidifier from the cathodes of the fuel cells and is diluted with air through the humidifier, so the hydrogen is discharged to the atmosphere through an exhaust system with the concentration reduced.

However, as described above, although in the related art the concentration of hydrogen to be discharged is slightly reduced by mixing the hydrogen with air discharged from cathodes in a humidifier in accordance with the operation conditions of fuel cell systems, it is difficult to sufficiently mix the hydrogen and air, so the concentration of the hydrogen is not remarkably decreased.

Accordingly, in the related art, since the concentration of hydrogen discharged from fuel cell systems is not effectively reduced and there is quite a possibility of discharging hydrogen that has not been diluted, the discharged hydrogen having concentration over a predetermined level may cause ignition and explosion depending on the operation conditions of the fuel cell systems.

In order to prevent this problem, a method to discharge hydrogen after reducing the concentration of the hydrogen to be discharged through an exhaust system to a predetermined level or less is necessarily applied to the fuel cell system.

Recently, in order to prevent the possibility of ignition and explosion by hydrogen discharged from fuel cells, the concentration of hydrogen that fuel cell systems discharged to the atmosphere through exhaust systems is regulated less than 8% at the maximum and less than 4% per 3 second on the average by domestic regulations and relevant laws in the global technical regulation (GTR) about vehicle.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a device for decreasing the hydrogen concentration of a fuel cell system that can effectively reduce the hydrogen concentration in an exhaust gas discharged to the atmosphere through an exhaust system of the fuel cell system, and can satisfy the laws governing hydrogen that is discharged from fuel cell vehicles in domestic regulations and the relevant laws in the global technical regulation (GTR) about vehicle.

According to an exemplary embodiment in the present disclosure, a device for decreasing hydrogen concentration of a fuel cell system, which is installed in an exhaust system of a fuel cell system discharging exhaust gas including hydrogen and air and discharged from fuel cells to the atmosphere through an exhaust line, includes a catalyst diluter that includes catalysts for diluting hydrogen in an exhaust gas by generating a catalytic reaction and is connected to the exhaust line. An air diluter is disposed outside the catalyst diluter and guides external air to a gas exit side of the catalyst diluter.

When the exhaust gas is discharged from a front end to a rear end through the exhaust line, the catalyst diluter and the air diluter may be disposed in a predetermined section adjacent the rear end of the exhaust line.

The catalyst diluter may include a first pipe member that is connected to a front connection end of the predetermined section of the exhaust line, adjacent the rear end of the exhaust line, provide a first channel for the exhaust gas to flow, and has the catalysts in the first channel.

The air diluter may include a second pipe member that is connected to a rear connection end of the predetermined section of the exhaust line, with the first pipe member at the center portion therein, and provides a second channel for external air to flow between the outer side of the first pipe member and the second pipe member.

The first and second pipe members may make a coaxial dual pipe.

The second channel may be formed between the outer side of the first pipe member and the inner side of the second pipe member.

The first pipe member may have a gas entrance that is connected to the front connection end of the predetermined section of the exhaust line for the exhaust gas to flow inside, and a gas exit disposed inside the second pipe member to discharge the exhaust gas passing by the catalysts.

The gas entrance may have a shape of which the diameter is gradually decreased in a discharge direction of the exhaust gas.

The second pipe member may have an air entrance disposed adjacent the gas entrance for external air to flow into the second channel, and an air exit connected to the rear connection end of the predetermined section of the exhaust line to guide external air to the gas exit.

When the exhaust gas is discharged from a front end to a rear end through the exhaust line, the catalyst diluter and the air diluter may be integrally formed and disposed at the rear end of the exhaust line.

The catalyst diluter may include a first pipe member that is connected to a rear end of the exhaust line, provides a first channel for the exhaust gas to flow, and has the catalysts in the first channel.

The air diluter may include a second pipe member that is integrally connected to the first pipe member, with the first pipe member at the center portion therein, and provides a second channel for external air to flow between the outer side of the first pipe member and the second pipe member.

The first pipe member may have a gas entrance connected to the rear end of the exhaust line for the exhaust gas to flow inside, and a gas exit disposed inside the second pipe member to discharge the exhaust gas passing by the catalysts.

The second pipe member may have an air entrance disposed adjacent the gas entrance for external air to flow into the second channel, and an air exit open to the atmosphere to guide the external air to the gas exit.

The catalysts may include white gold and palladium and produce heat and water by reacting with oxygen and hydrogen in the exhaust gas.

The catalysts may have a cross-sectional area corresponding to the cross-sectional area of the exhaust gas channel of the catalyst diluter and may have a plurality of meshes for passing the exhaust gas.

The catalysts may be positioned at an upper portion over the center of the exhaust gas channel of the catalyst diluter and may have a plurality of meshes for passing the exhaust gas.

According to another exemplary embodiment in the present disclosure, a device for decreasing hydrogen concentration of a fuel cell system, which is installed in an exhaust system discharging exhaust gas including hydrogen and air and discharged from fuel cells to the atmosphere through an exhaust line, includes a catalyst diluter that includes catalysts for diluting hydrogen in an exhaust gas by generating a catalytic reaction and is connected to a front connection end of a predetermined section of the exhaust line, adjacent a rear end of the exhaust line. An air diluter is connected to the rear connection end of the predetermined section of the exhaust line, with the catalyst diluter therein, and guides external air to a gas exit side of the catalyst diluter.

The catalyst diluter may provide a first channel for exhaust gas to flow to the center in the exhaust line.

The air diluter may provide a second channel that is connected to the rear connection end of the predetermined section of the exhaust line at the gas exit of the catalyst diluter for external air to flow inside between the outer side of the catalyst diluter and the air diluter Yet according to another exemplary embodiment in the present disclosure, a device for decreasing hydrogen concentration of a fuel cell system, which is installed in an exhaust system of a fuel cell system discharging exhaust gas including hydrogen and air and discharged from fuel cells to the atmosphere through an exhaust line, includes a catalyst diluter that includes catalysts for diluting hydrogen in an exhaust gas by generating a catalytic reaction and is connected to a rear end of the exhaust line. An air diluter is integrally connected to the catalyst diluter, with the catalyst diluter therein, and guides external air to a gas exit side of the catalyst diluter.

The catalyst diluter may provide a first channel for exhaust gas to flow to the center in the exhaust line.

The air diluter may provide a second channel that is open to the atmosphere at the gas exit of the catalyst diluter for external air to flow inside between the outer side of the catalyst diluter and the air diluter According to the exemplary embodiments in the present disclosure, the hydrogen concentration in an exhaust gas can be primarily reduced through the catalyst diluter and secondarily reduced through the air diluter.

Accordingly, by effectively reducing the concentration of hydrogen discharged to the atmosphere through the exhaust system of the fuel cell system, it is possible to satisfy the laws governing hydrogen that is discharged from fuel cell vehicles in domestic regulations and the relevant laws in GTR about vehicle and to ensure competitive priority in relation to reduction of hydrogen discharged from fuel cell vehicles.

BRIEF DESCRIPTION OF THE DRAWINGS

The drawings are provided for reference in describing exemplary embodiments and the spirit of the present disclosure should not be construed only by the accompanying drawings.

DETAILED DESCRIPTION OF THE EMBODIMENTS

Figure 1:
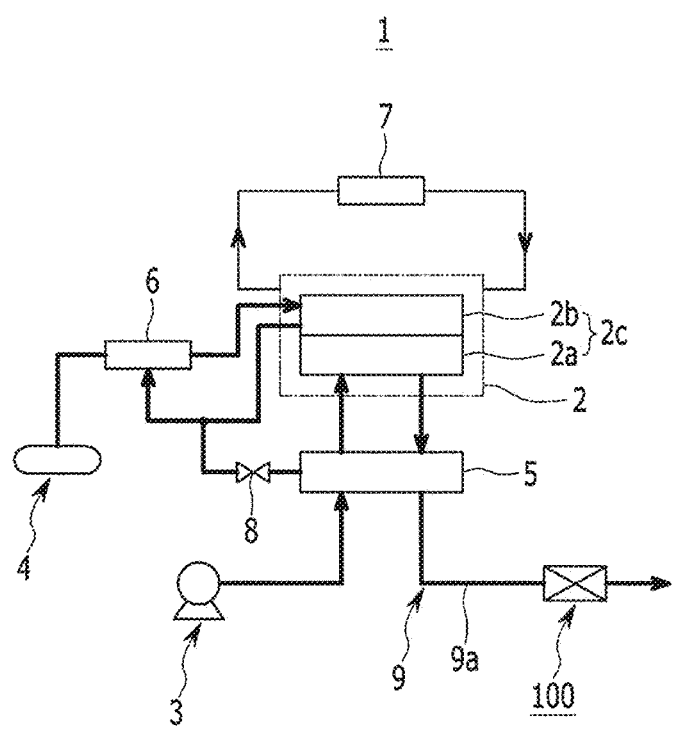
FIG. 1 is a block diagram schematically illustrating an example of a fuel cell system to which embodiments in the present disclosure are applied.

The present disclosure will be described more fully hereinafter with reference to the accompanying drawings, in which exemplary embodiments of the invention are illustrated. As those skilled in the art would realize, the described embodiments may be modified in various different ways, all without departing from the spirit or scope of the present disclosure.

Configurations irrelevant to description are omitted to clearly describe the present disclosure and like reference numerals designate like elements throughout the specification.

Further, the sizes and thicknesses of the configurations illustrated in the drawings are provided selectively for the convenience of description, so that the present disclosure is not limited to those illustrated in the drawings and the thicknesses are exaggerated to make some parts and regions clear.

Discriminating the names of components with the first, the second, and the like, in the following description is for discriminating them for the same relationship of the components and the components are not limited to the order in the following description.

Throughout the specification, unless explicitly described to the contrary, the word "comprise" and variations such as "comprises" or "comprising", will be understood to imply the inclusion of stated elements but not the exclusion of any other elements.

Further, the terms, " . . . unit", " . . . mechanism", " . . . portion", " . . . member" and the like, used herein mean the units of inclusive components performing at least one or more functions or operations.

FIG. 1 is a block diagram schematically illustrating an example of a fuel cell system to which embodiments in the present disclosure are applied.

Referring to FIG. 1, a fuel cell system 1 to which the present disclosure is applied, which is an electric generator system that generates electrical energy using an electrochemical reaction of fuel and an oxidizer, may be mounted, for example, on a fuel cell vehicle that operates an electric motor using electrical energy.

In the present disclosure, fuel that is used for the fuel cell system 1 may be defined as a hydrogen gas (hereafter, referred to as "hydrogen" for convenience) and an oxidizer that s used for the fuel cell system 1 may be defined as air.

The fuel cell system 1 basically includes a fuel cell stack 2, an air supply unit 3, a hydrogen supply unit 4, a humidifier 5, a hydrogen recycling unit 6, and a heat/water control unit 7.

The fuel cell stack 2 is an assembly of fuel cells 2c, which each have a membrane (not illustrated), a cathode 2a, and an anode 2b, for generating electricity. The fuel cells 2c are supplied with hydrogen through the anodes 2b and air through the cathodes 2a, whereby they can generate electrical energy using an electrochemical reaction of hydrogen and oxygen.

The air supply unit 3 is operated by power and supplies atmospheric air to the cathodes 2a of the fuel cells 2c. The air supply unit 3 may include an air compressor and an air blower. The hydrogen supply unit 4 may include a hydrogen tank for compressing and keeping hydrogen and supplying the compressed hydrogen to the anodes 2b of the fuel cells 2c.

The humidifier 5 may include a membrane-humidifying unit that humidifies the air supplied from the air supply unit 3, using the air including water and discharged from the cathodes 2a of the fuel cells 2c, and supplies the humidified air to the cathodes 2a.

The hydrogen recycling unit 6 circulates the hydrogen, which is discharged from the anodes 2b of the fuel cells 2c, back to the anodes 2b. The hydrogen recycling unit 6 can mix the hydrogen discharged from the anodes 2b with the hydrogen supplied from the hydrogen supply unit 4 through an ejector, and the like, and then supply the hydrogen mixture to the anodes 2b.

The heat/water control unit 7 removes heat and water, which are by-products produced by an electrochemical reaction of the fuel cells 2c, and controlling an operation temperature of the fuel cell stack 2.

These components of the fuel cell system are well known in the art, so they are not described in detail herein.

On the other hand, if the fuel cell system 1 is mounted in a fuel cell vehicle, when the vehicle starts, the fuel cell system 1 discharges hydrogen due to crossing-over together with air through the cathodes 2a of the fuel cells 2c, and discharges purge hydrogen through the anodes 2b of the fuel cells 2c.

Further, while the vehicle runs, the fuel cell system 1 discharges only the purge hydrogen through the anodes 2b of the fuel cells 2c, and when the vehicle stops or idles (for example, under an ISG condition), the fuel cell system 1 discharges hydrogen due to crossing-over together with air through the cathodes 2a of the fuel cells 2c.

The crossing-over hydrogen may be defined as the hydrogen that crosses over to the cathodes 2a through the membrane due to residual pressure of the hydrogen remaining at the anodes 2b of the fuel cells 2c when the fuel cell system 1 stops.

Further, the purge hydrogen may be defined as the hydrogen discharged with impurities from the anodes 2b by a purge valve 8 to remove the impurities such as hydrogen and vapor accumulated on the anodes 2b of the fuel cells 2c during the operation of the fuel cell system 1.

The hydrogen discharged from the fuel cells 2c or hydrogen including air is, for example, supplied to the humidifier 5 and then discharged with air from the humidifier 5, and in this process, the hydrogen is diluted with air and discharged with the concentration slightly reduced.

That is, when a vehicle starts, runs, stops, or idles, the hydrogen discharged from the fuel cells 2c flows into the humidifier 5 together with the air discharged from the fuel cells 2c, so the hydrogen can be discharged with the concentration slightly reduced by the air.

Accordingly, the fuel cell system 1 includes an exhaust system 9 for discharging the gas, which is discharged through the humidifier 5 (gas including hydrogen and air and referred to as "exhaust gas" hereafter), to the atmosphere. Herein, the exhaust gas includes water and vapor other than hydrogen and air.

The exhaust system 9 includes an exhaust line 9a mounted on the lower structure of the vehicle in a longitudinal direction of the vehicle. The exhaust line 9a discharges the exhaust gas to the atmosphere by sending it rearward through the vehicle.

Further, the exhaust line 9a is an exhaust pipe through which the exhaust gas flows, and various parts, such as a muffler reducing exhaust noise and a sensor sensing the concentration of hydrogen, may be disposed in a predetermined section of the exhaust line 9a.

The device 100 for decreasing hydrogen concentration of a fuel cell system according to the present disclosure may be installed in the exhaust line 9a of the exhaust system 9. That is, according to the present disclosure, the device 100 decreases hydrogen concentration of a fuel cell system that can effectively reduce the hydrogen concentration in an exhaust gas discharged to the atmosphere through the exhaust system 9 and can satisfy domestic regulations and relevant laws for regulating hydrogen discharged from fuel cell vehicles under the global technical regulation (GTR).

Figure 2:
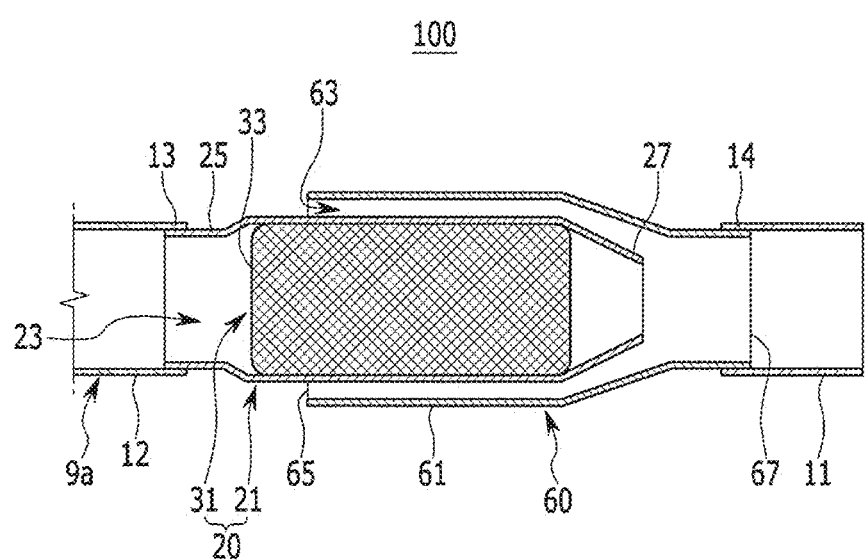
FIG. 2 is a first cross-sectional view illustrating a device for decreasing hydrogen concentration of a fuel cell system according to an exemplary embodiment in the present disclosure.
Figure 3:
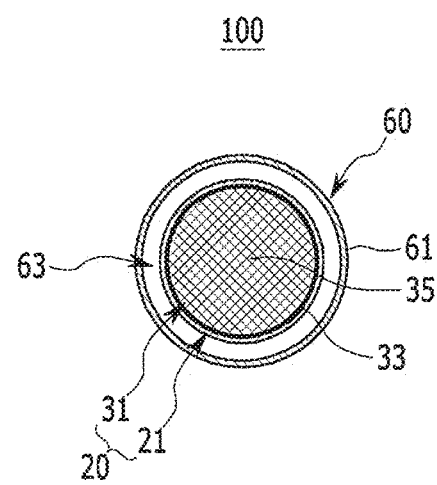
FIG. 3 is a second cross-sectional view illustrating a device for decreasing hydrogen concentration of a fuel cell system according to an exemplary embodiment in the present disclosure.

FIG. 2 is a first cross-sectional view illustrating a device for decreasing hydrogen concentration of a fuel cell system according to the present disclosure, and FIG. 3 is a second cross-sectional view illustrating a device for decreasing hydrogen concentration of a fuel cell system according to the present disclosure.

Referring to FIGS. 1-3, the device 100 for decreasing hydrogen concentration includes a catalyst diluter 20 and an air diluter 60.

Prior to describing the catalyst diluter 20 and the air diluter 60, the device 100 for decreasing hydrogen concentration of a fuel cell system may be installed at a predetermined section adjacent a rear end of the exhaust line 9a.

The reason of installing the device 100 adjacent the rear end of the exhaust line 9a is to prevent condensate water from freezing at a predetermined section of the exhaust line 9a in winter by easily discharging condensate water in an exhaust gas flowing through the exhaust line 9a.

Further, another reason of installing the device 100 adjacent the rear end of the exhaust line 9a is to maximize the ability to dilute hydrogen in the exhaust gas discharged through the exhaust line 9a with external air.

Herein, the predetermined section of the exhaust line 9a may be defined as a section between a first section 11 adjacent the rear end of the entire exhaust line 9a and a second section 12 except the portion 11. The first section 11 and the second section 12 are fixed to the lower structure of a vehicle.

The device 100 for decreasing hydrogen concentration of a fuel cell system according to the present disclosure is disposed between the first section 11 and the second section 12 of the exhaust line 9a and mutually connects the first section 11 and the second section 12.

In the following description, the connection end of the second section 12 connected to the device 100 for decreasing hydrogen concentration of a fuel cell system in the predetermined section of the exhaust line 9a is referred to as a front connection end 13. Further, the connection end of the first section 11 connected to the device 100 for decreasing hydrogen concentration of a fuel cell system in the predetermined section of the exhaust line 9a is referred to as a rear connection end 14.

Further, the term "end" may be defined as an end or a portion (end portion) including the end, but it is defined as the latter in the present disclosure.

The catalyst diluter 20 is provided for diluting the hydrogen in an exhaust gas discharged through the exhaust line 9a of the exhaust system 9, using a catalytic reaction.

The catalyst diluter 20 is coupled to the front connection end of a predetermined section of the exhaust line 9a at the rear end portion of the exhaust line 9a, that is, the front connection end 13 of the second section 12 described above. The catalyst diluter 20 includes a first pipe member 21 having catalysts 31.

The first pipe member 21 is a pipe for generating a stream of an exhaust gas, and in detail, it is a cylindrical pipe with both ends opened. The first pipe member 21 is connected to the front connection end 13 of the second section 12.

The first pipe member 21 provides a first channel 23 for an exhaust gas to flow. The first pipe member 21 has a gas entrance 25 for the exhaust gas discharged through the second section 12 to flow into the first channel 23. The gas entrance 25, which is the front end of both open ends of the first pipe member 21, is connected to the front connection end 13 of the second section 12.

Further, the first pipe member 21 has a gas exit 27 for discharging an exhaust gas passing by the catalysts 31 to be described in detail below. The gas exit 27, which is the rear end of both open ends of the first pipe member 21, is connected to the air diluter 60 to be described below.

The gas exit 27 of the first pipe member 21 is tapered such that the diameter gradually decreases in the discharge direction of an exhaust gas. That is, the first pipe member 21 may have a shape of which the diameter is uniform in a predetermined section from the gas entrance 25 and then gradually decreased in the discharge direction of an exhaust gas from the end of the section.

The catalysts 31 dilute the hydrogen in the exhaust gas flowing through the first channel 23 of the first pipe member 21 by reacting with the hydrogen. The catalysts 31 are disposed in the first channel 23 of the first pipe member 21.

The catalysts 31 have a cross-sectional area corresponding to the cross-sectional area of the exhaust gas channel of the first pipe member 21 and are disposed in the entire area or in some area between the gas entrance 25 and the gas exit 27 of the first pipe member 21 in the first channel 23.

The catalysts 31 produce heat and water by catalyst-reacting with hydrogen and oxygen in the exhaust gas flowing through the first channel 23, thereby reducing the concentration of the hydrogen.

The catalysts 31 decompose hydrogen in the exhaust gas into hydrogen ions and electrons and generates an exothermic reaction that produces heat and water by making the hydrogen ion and electrons react with the oxygen in the atmosphere.

The catalysts 31 are formed by putting a catalytic substance (not illustrated) into a container 33 and the container 33 have meshes 35 for passing the exhaust gas. The meshes 35 are arranged along the first channel 23 and may be formed in a rectangular shape, a hexagonal shape, or a triangular shape. Further, the catalytic substance may include white gold or palladium.

As described above, by changing the meshes 35 in various shapes, it is possible to reduce the amount a catalytic substance to be used and maximize the efficient in a catalytic reaction for diluting hydrogen in the present disclosure.

The catalysts 31 generate an exothermic reaction by absorbing hydrogen and produce heat and water, such as a metal hydride well known in the art, so the composition and structure are not described in detail herein.

The catalysts 31 have a function as a silencer that reduces exhaust noise by the exhaust gas flowing through the exhaust line 9a, in addition to the function of diluting the hydrogen in the exhaust gas flowing through the first channel 23 by generating a catalytic reaction.

In the present disclosure, the air diluter 60 is provided for diluting the hydrogen in the exhaust gas discharged from the first pipe member 21 with external air by guiding the external air to the gas-discharging portion of the catalyst diluter 20, that is, to the gas exit 27 of the first pipe member 21.

Further, the air diluter 60 has another function that reduces the temperature of the exhaust gas discharged from the first pipe member 21 and the temperature of the first pipe member 21, which are instantaneously increased by an exothermic reaction between the exhaust gas and the catalysts 31 in the catalyst diluter 20, using external air.

The air diluter 60 is connected to the rear connection end of the predetermined section of the exhaust line 9a, that is, to the rear connection end 14 of the first section 11 described above, with the catalyst diluter 20 therein. The air diluter 60 includes a second pipe section 61 provided outside the catalyst diluter 20.

The second pipe member 61 is a pipe for generating a stream of an external air between the outer side of the first pipe member 21, and second pipe member 61, in detail, is a cylindrical pipe with both ends open. The second pipe member 61 is connected to the rear connection end 14 of the first section 11 with the first pipe member 21 at the center portion therein.

The second pipe member 61 provides a second channel 63 for external air to flow between the outer side of the first pipe member 21, and second pipe member 61. That is, the first and second pipe members 21 and 61 make a coaxial dual pipe, in which the second channel 63 may be formed between the outer side of the first pipe member 21 and the inner side of the second pipe member 61.

Herein, the second channel 63 is connected to the gas exit 27 of the first pipe member 21 between the outer side of the first pipe member 21 and the inner side of the second pipe member 61, thereby generating a stream of external air that reaches the rear connection end 14 of the first section 11.

The second pipe member 61 provides an air entrance 65 for external air to flow into the second channel 63. The air entrance 65, which is the front end of both open ends of the second pipe member 61, is positioned adjacent the gas entrance 25 of the first pipe member 21 and open to the atmosphere.

Further, the second pipe member 61 provides an air exit 67 for external air, which is guided to the gas exit 27 of the first pipe member 21 through the second channel 63, to flow into the first section 11 described above. The air exit 67, which is the rear end of both open ends of the second pipe member 61, is connected to the rear connection end 14 of the first section 11.

Herein, the air exit 67 of the second pipe member 61 may have a shape of which the diameter is gradually decreased in the discharge direction of the exhaust gas to correspond to the gas exit 27 of the first pipe member 21. That is, the second pipe member 61 may have a shape of which the diameter is uniform in a predetermined section in a flow direction of external air from the air entrance 65 and then gradually decreased in the flow direction of external air from the end of the section.

The stream of external air flowing through the second channel 63 may be generated by a pressure difference between the air entrance 65 of the second pipe member 61 and the gas exit 27 of the first pipe member 21.

That is, the pressure of the exhaust gas discharged from the gas exit 27 after passing by the catalyst 31 in the first pipe member 21 is larger than the atmospheric pressure around the air entrance 65, so external air flows into the air entrance 65 in accordance with Bernoulli's theorem, so it can generate a stream reaching to the gas exit 27 through the second channel 63.

Further, the amount of external air flowing inside through the air entrance 65 of the second pipe member 61 can be controlled by changing the diameter of the gas exit 27 and the pressure at the gas exit 27.

The operation of the device 100 for decreasing hydrogen concentration of a fuel cell system according to the present disclosure which has the configuration described above is described hereafter in detail with reference to drawings including the drawings stated above.

Figure 4:
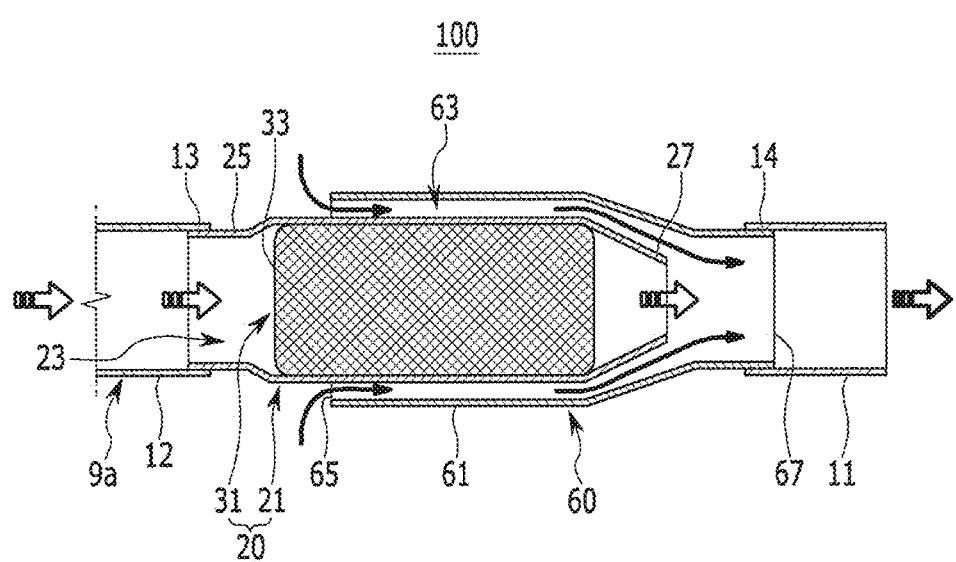
FIG. 4 is a view illustrating the operation of a device for decreasing hydrogen concentration of a fuel cell system according to an exemplary embodiment in the present disclosure.

FIG. 4 is a view illustrating the operation of a device for decreasing hydrogen concentration of a fuel cell system according to the present disclosure.

First, referring to FIG. 1 stated above, in the present disclosure, when a vehicle starts, a fuel cell system 1 discharges hydrogen due to crossing-over with air through the cathodes 2a of the fuel cells 2c and discharges purge hydrogen through the anodes 2b of the fuel cells 2c.

Further, while the vehicle runs, the fuel cell system 1 discharges the purge hydrogen through the anodes 2b of the fuel cells 2c, and when the vehicle is stopped or idles (for example, under an ISG condition), the fuel cell system 1 discharges hydrogen due to crossing-over together with air through the cathodes 2a of the fuel cells 2c.

The hydrogen discharged from the fuel cells 2c is supplied to the humidifier 5 and then discharged with air from the humidifier 5, and in this process, the hydrogen can be diluted with air and discharged with the concentration slightly reduced.

The exhaust gas (gas including hydrogen and air) discharged from the humidifier 5 flows through the exhaust line 9a of the exhaust system 9 and is discharged to the atmosphere, and in this process, the exhaust gas, as illustrated in FIG. 4, flows into the gas entrance 25 of the first pipe member 21 of the catalyst diluter 20.

The exhaust gas flowing into the gas entrance 25, as described above, flows through the first channel 23 of the first pipe member 21 and passes through the meshes 35 of the catalysts 31. In this process, the catalysts 31 decompose the hydrogen in the exhaust gas into hydrogen ions and electrons, and water and heat are produced by an exothermic reaction of the hydrogen ion, the electrons, and the oxygen in the air.

According to the present disclosure, the hydrogen in the exhaust gas and oxygen are converted into water and the hydrogen is diluted by a catalytic reaction of the catalysts 31, so it is possible to primarily reduce the concentration of the hydrogen in the exhaust gas.

Further, according to the present disclosure, the pressure of the exhaust gas discharged through the exhaust line 9a is distributed by the catalysts 31, whereby it is possible to reduce exhaust noise of the exhaust gas.

As described above, the exhaust gas that has been primarily decreased in hydrogen concentration through the catalyst diluter 20 is discharged through the gas exit 27 of the first pipe member 21.

In this process, in the present disclosure, since the pressure of the exhaust gas discharged through the gas exit 27 is larger than the atmospheric pressure around the air entrance 65 of the second pipe member 61, external air may flow into the air entrance 65 due to the pressure difference between the air entrance 65 and the gas exit 27.

The external air flowing into the air entrance 65 makes a stream reaching to the gas exit 27 through the second channel 63 between the first and second pipe members 21 and 61.

Accordingly, the external air is guided to the gas exit 27 through the second channel 63 and the hydrogen in the exhaust gas is diluted by the external air by mixing the external air with the exhaust gas discharged through the gas exit 27, whereby it is possible to secondarily reduce the concentration of the hydrogen.

Further, as the external air is guided to the gas exit 27 through the second channel 63, it is possible to reduce the temperature of the exhaust gas discharged through the first pipe member 21 and the temperature of the first pipe member 21 that are instantaneously increased by the exothermic reaction of the catalyst 31.

As described above, the hydrogen concentration in the exhaust gas is secondarily reduced by mixing the exhaust gas and external air at the gas exit 27 of the first pipe member 21, and then the exhaust gas of which the hydrogen concentration have been secondarily reduced is discharged to the atmosphere through the first section 11 of the exhaust line 9a in the present disclosure.

According to the device 100 for decreasing hydrogen concentration of a fuel cell system according to the present disclosure, the hydrogen concentration in an exhaust gas can be primarily reduced through the catalyst diluter 20 and secondarily reduced through the air diluter 60.

Accordingly, by effectively reducing the concentration of hydrogen discharged to the atmosphere through the exhaust system 9 of the fuel cell system 1, it is possible to satisfy the laws governing hydrogen that is discharged from fuel cell vehicles in domestic regulations and the relevant laws in GTR about vehicle and to ensure competitive priority in relation to reduction of hydrogen discharged from fuel cell vehicles.

Figure 5:
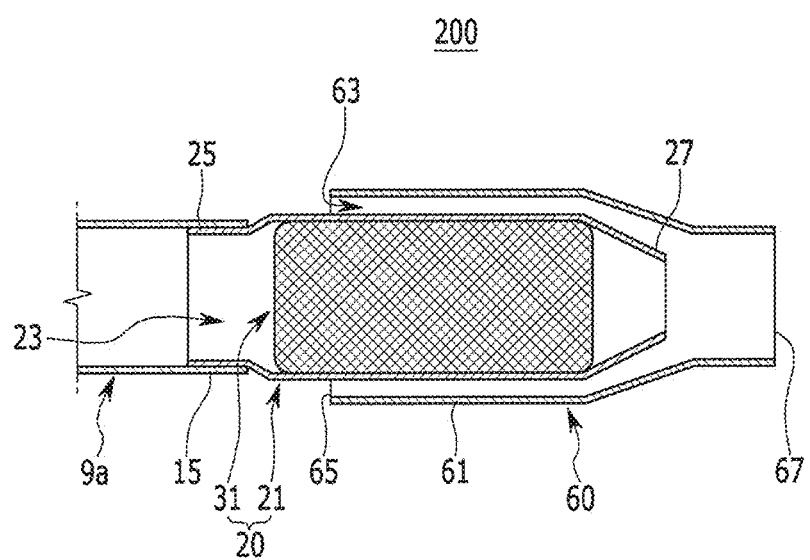
FIGS. 5 and 6 are cross-sectional views schematically illustrating a device for decreasing hydrogen concentration of a fuel cell system according to another exemplary embodiment in the present disclosure.
Figure 6:
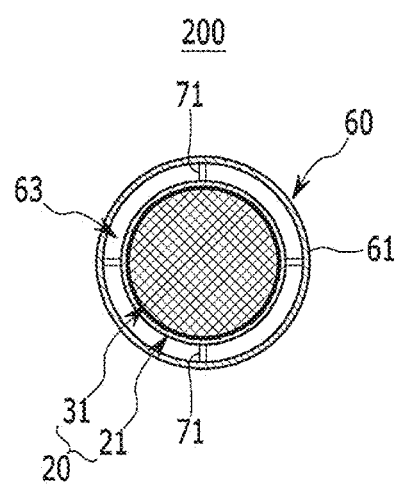

FIGS. 5 and 6 are cross-sectional views schematically illustrating a device for decreasing hydrogen concentration of a fuel cell system according to another exemplary embodiment in the present disclosure.

Referring to FIGS. 5 and 6, a device 200 for decreasing hydrogen concentration of a fuel cell system according to another exemplary embodiment basically has the configuration of the previous exemplary embodiment and may be disposed at the rear end 15 (the very end of the rear) of an exhaust line 9a.

In an exemplary embodiment, the catalyst diluter 20 and the air diluter 60 are mounted at the rear end 15 of the exhaust line 9a. The catalyst diluter 20 is connected to the rear end 15 of the exhaust line 9a. Further, the air diluter 60 is integrally connected with the catalyst diluter 20 with the catalyst diluter 20 therein.

The catalyst diluter 20, as in the previous exemplary embodiment, provides a first channel 23 defined by a first pipe member 21 for an exhaust gas to flow, catalysts 31 are disposed in the first channel 23, and a gas entrance 25 and a gas exit 27 are formed at both ends of the first pipe member 21, respectively. Herein, the gas entrance 25 is connected to the rear end 15 of the exhaust line 9a.

Further, the air diluter 60 provides a second channel 63 for external air to flow with the first pipe member 21 at the center portion inside the second pipe member 61, and an air entrance 65 and an air exit 67 are formed at both ends of the second pipe member 61, respectively. The second channel 63 is formed between the outer side of the first pipe member 21 and the inner side of the second pipe member 61.

Herein, the air entrance 65 is open to the atmosphere around the gas entrance 25 of the first pipe member 21 and the air exit 67 is open to the atmosphere around the gas exit 27 of the first pipe member 21.

A stream of external air connecting the air entrance 65 of the second pipe member 21 to the atmosphere and connecting the air exit 67 of the second pipe member 61 to the atmosphere is formed in the second channel 63 between the outer side of the first pipe member 21 and the inner side of the second pipe member 61.

Further, the second pipe member 61 is integrally coupled to the first pipe member 21 with the first pipe member 21 at the center portion therein. The first and second pipe members 21 and 61 make a coaxial dual pipe, in which the second channel 63 may be formed between the outer side of the first pipe member 21 and the inner side of the second pipe member 61.

In this configuration, the first and second pipe members 21 and 61 are integrally coupled by connecting members 71 such as connecting pins and, for example, the connecting member 71 may integrally couple the outer side of the first pipe member 21 and the inner side of the second pipe member 61.

Therefore, in the present disclosure, it is possible to primarily reduce the hydrogen concentration in an exhaust gas through the catalyst diluter 20 and secondarily reduce the hydrogen concentration in the exhaust gas through the air diluter 60, as in the previous exemplary embodiment. Further, the exhaust gas of which the hydrogen concentration has been secondarily reduced is discharged to the atmosphere through the air exit 67 of the second pipe member 61.

As described above, the other configuration and operational effects of the device 200 for decreasing hydrogen concentration of a fuel cell system according to another exemplary embodiment are the same as those in the previous exemplary embodiment, so the detailed description is not provided.

Figure 7:
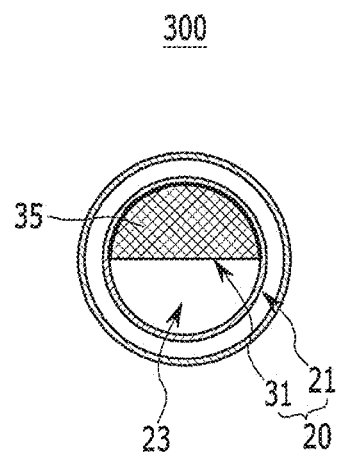
FIG. 7 is a cross-sectional view illustrating a device for decreasing hydrogen concentration of a fuel cell system according to yet another exemplary embodiment in the present disclosure.

FIG. 7 is a cross-sectional view illustrating a device for decreasing hydrogen concentration of a fuel cell system according to an exemplary embodiment in the present disclosure.

Referring to FIG. 7, a device for decreasing hydrogen concentration of a fuel cell system according to another exemplary embodiment has the configurations of the previous exemplary embodiments and may include a catalyst diluter 20 having a catalyst 31 above the center of an exhaust gas channel.

The catalyst 31 is positioned at the upper portion in a first channel 23 of a first pipe member 21 and has a plurality of meshes 35.

That is, the catalyst 31 occupies the semicircular cross-section over the center of the cross-section of the exhaust gas channel of the first channel 23 and may be formed in the entire area or some area between a gas entrance (not illustrated) and a gas exit (not illustrated) of the first pipe member 21.

The reason of disposing the catalyst 31 at the upper portion in the first channel 23 of the first pipe member 21 is because the hydrogen concentration in the exhaust gas flowing through the first channel 23 is higher at the upper stream than the lower stream of the exhaust gas.

Herein, the reason that the hydrogen concentration in the exhaust gas is higher at the upper stream than the lower stream of the exhaust gas is that the percentage of hydrogen is smaller than the percentage of air in the exhaust gas, so hydrogen particles gather together at the upper portion in the first channel 23.

Accordingly, since the catalyst 31 is positioned at the upper portion of the first channel 23 in the first pipe member 21, it is possible to maximizing the efficiency of the reaction of diluting hydrogen with the catalyst while reducing the amount of use of the catalyst 31.

Further, since the catalyst 31 is positioned at the upper portion of the first channel 23 in the first pipe member 21, it is possible to prevent an increase in differential pressure in the air supply system for sending exhaust gas through the humidifier.

Therefore, it is possible to prevent a problem with the efficiency of the fuel cell system due to an increase in power consumed by the air supply unit that is caused by an increase in differential pressure in the air supply system.

As described above, the other configuration and operational effects of the device 300 for decreasing hydrogen concentration of a fuel cell system according to yet another exemplary embodiment are the same as those in the previous exemplary embodiments, so the detailed description is not provided.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A device for decreasing hydrogen concentration of a fuel cell system, wherein the fuel cell system is installed in an exhaust system discharging exhaust gas which includes the hydrogen and air and is discharged from fuel cells to atmosphere through an exhaust line, the device comprising:
   a catalyst diluter including catalysts for diluting the hydrogen in the exhaust gas by generating a catalytic reaction, the catalyst diluter connected to the exhaust line; and
   an air diluter disposed outside the catalyst diluter and guiding external air to a gas exit side of the catalyst diluter,
   wherein the catalyst diluter includes a first pipe member connected to a front connection end of a predetermined section of the exhaust line adjacent a rear end of the exhaust line, the first pipe member providing a first channel for the exhaust gas to flow and having the catalysts in the first channel, and
   wherein the air diluter includes a second pipe member connected to a rear connection end of the predetermined section of the exhaust line with the first pipe member at a center portion therein, the second pipe member providing a second channel for the external air to flow between an outer side of the first pipe member and the second pipe member.

2. The device of claim 1, wherein when the exhaust gas is discharged from a front end to the rear end through the exhaust line, the catalyst diluter and the air diluter are disposed in a predetermined section adjacent the rear end of the exhaust line.

3. The device of claim 1, wherein the first and second pipe members form a coaxial dual pipe, and
   wherein the second channel is formed between the outer side of the first pipe member and an inner side of the second pipe member.

4. The device of claim 1, wherein the first pipe member includes:
   a gas entrance connected to the front connection end of the predetermined section of the exhaust line for the exhaust gas to flow inside the device; and
   a gas exit disposed inside the second pipe member to discharge the exhaust gas passing by the catalysts.

5. The device of claim 4, wherein the gas entrance have a shape of which ae diameter gradually decreases in a discharge direction of the exhaust gas.

6. The device of claim 4, wherein the second pipe member includes:
   an air entrance disposed adjacent the gas entrance for the external air to flow into the second channel: and
   an air exit connected to the rear connection end of the predetermined section of the exhaust line to guide the external air to the gas exit.

7. The device of claim 1, wherein when the exhaust gas is discharged from a front end to the rear end through the exhaust line, the catalyst diluter and the air diluter are integrally formed and disposed at the rear end of the exhaust line.

8. The device of claim 1,
   wherein the second pipe member is integrally connected to the first pipe member.

9. The device of claim 8, wherein the first pipe member includes:
   a gas entrance connected to the rear end of the exhaust line for the exhaust gas to flow inside the device, and
   a gas exit disposed inside the second pipe member to discharge the exhaust gas passing by the catalysts.

10. The device of claim 9, wherein the second pipe member includes:
    an air entrance disposed adjacent the gas entrance for the external air to flow into the second channel, and
    an air exit opened to the atmosphere to guide the external air to the gas exit.

11. The device of claim 1, wherein the catalyst includes white gold and palladium and produces heat and water by reacting with oxygen and the hydrogen in the exhaust gas.

12. The device of claim 1, wherein the catalysts include a cross-sectional area corresponding to a cross-sectional area of an exhaust gas channel of the catalyst diluter and have a plurality of meshes for passing the exhaust gas.

13. The device of claim 1, wherein the catalysts are positioned at an upper portion over a center of the exhaust gas channel of the catalyst diluter and have a plurality of meshes for passing the exhaust gas.

14. A device for decreasing hydrogen concentration of a fuel cell system, wherein the fuel cell system is installed in an exhaust system discharging exhaust gas which includes the hydrogen and air and is discharged from fuel cells to atmosphere through an exhaust line, the device comprising:
    a catalyst diluter including catalysts for diluting the hydrogen in the exhaust gas by generating a catalytic reaction, the catalyst diluter connected to a front connection end of a predetermined section of the exhaust line, adjacent a rear end of the exhaust line; and an air diluter connected to a rear connection end of the predetermined section of the exhaust line with the catalyst diluter being disposed inside the air diluter, the air diluter guiding external air to a gas exit side of the catalyst diluter.

15. The device of claim 14, wherein the catalyst diluter has a first channel for the exhaust gas to flow through a center of the exhaust line, and wherein the air diluter has a second channel connected to the rear connection end of the predetermined section of the exhaust line at the gas exit of the catalyst diluter for the external air to flow inside the device between an outer side of the catalyst diluter and the air diluter.

16. A device for decreasing hydrogen concentration of a fuel cell system, wherein the fuel cell system is installed in an exhaust system discharging exhaust gas which includes the hydrogen and air and is discharged from fuel cells to atmosphere through an exhaust line, the device comprising:

a catalyst diluter including catalysts for diluting the hydrogen in the exhaust gas by generating a catalytic reaction, the catalyst diluter connected to a rear end of the exhaust line; and an air diluter integrally connected to the catalyst diluter with the catalyst diluter being disposed inside the air diluter, and guiding external air to a gas exit side of the catalyst diluter, wherein the catalyst diluter provides a first channel for the exhaust gas to flow through a center of the exhaust line, and wherein the air diluter includes a second channel opened to the atmosphere at the gas exit of the catalyst diluter for the external air to flow inside the device between an outer side of the catalyst diluter and the air diluter.

* * * * *